N. E. BROWN.
CENTER CLEANING AND OILING DEVICE.
APPLICATION FILED OCT. 25, 1919.
1,361,007.
Patented Dec. 7, 1920.
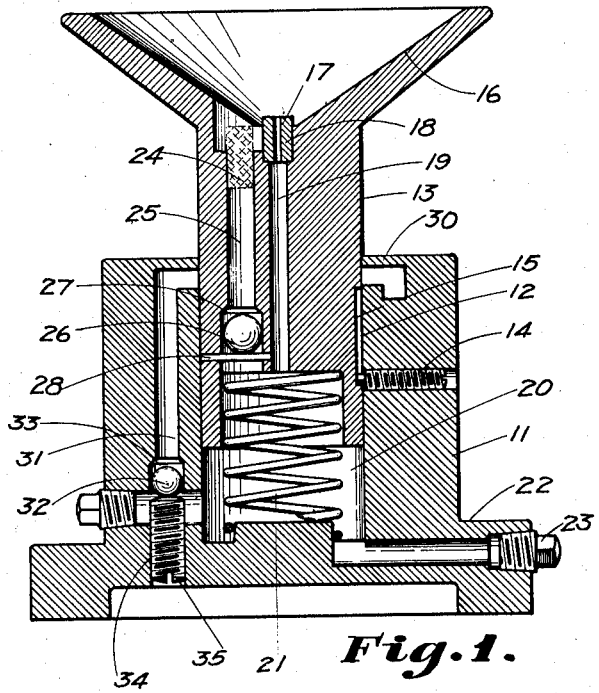
Fig. 1.
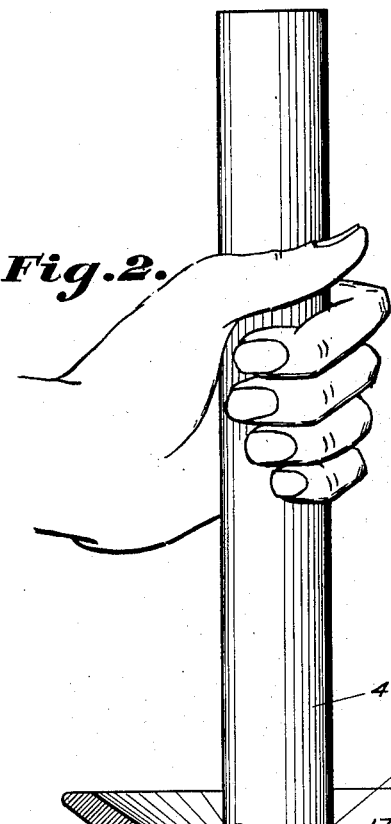
Fig. 2.
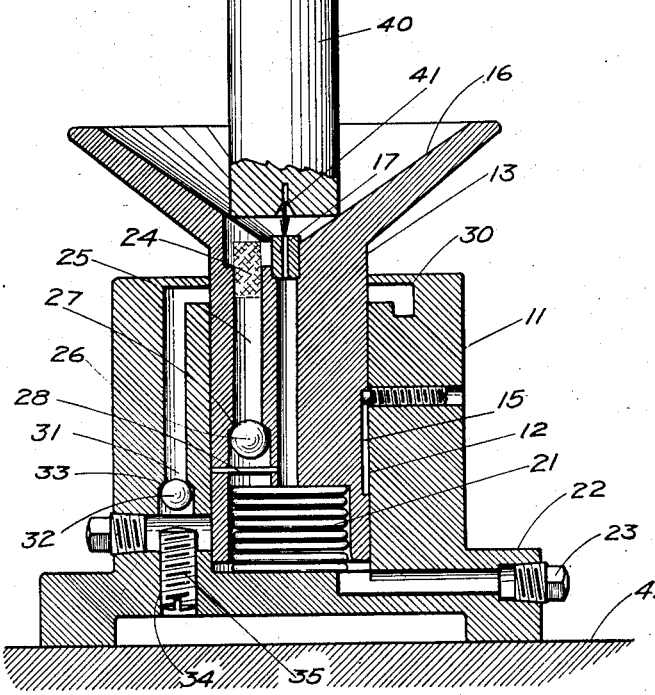
INVENTOR.
Nicholas E Brown
BY Graham & Clauin
ATTORNEY.

UNITED STATES PATENT OFFICE.

NICHOLAS E. BROWN, OF LOS ANGELES, CALIFORNIA, ASSIGNOR TO U. S. ELECTRICAL MANUFACTURING COMPANY, A CORPORATION OF CALIFORNIA.

CENTER CLEANING AND OILING DEVICE.

1,361,007.  Specification of Letters Patent.  Patented Dec. 7, 1920.

Application filed October 25, 1919. Serial No. 333,836.

*To all whom it may concern:*

Be it known that I, NICHOLAS E. BROWN, a citizen of the United States, residing at Los Angeles, in the county of Los Angeles and State of California, have invented a new and useful Improvement Comprising the Center Cleaning and Oiling Devices, of which the following is a specification.

My invention relates to the machinists' art, and an object of the invention is to provide a device by which the drilled centers of the shafting or the like can be readily cleaned and oiled. It is common practice in machine shops to drill an opening in the center of the ends of the shafting so that this shafting can be mounted upon centers for the purpose of turning or grinding-it. Where such shafting is produced in quantity, these centers are drilled and the shafting is often moved about, handled or allowed to remain in stock for considerable periods before the actual machining or grinding is done thereon.

It is always desirable and often necessary to clean out these centers before the machining operation is started on the shafting due to the fact that dirt and dust or chips get into the drilled centers, thus tending to throw the shaft off of center when mounted in the lathe or grinding machine, which impairs the accuracy of any subsequent turning or grinding operations.

This cleaning out of the drill center is commonly accomplished by means of a piece of wood or rag, such cleaning being imperfect and requiring some time. After these drilled centers are cleaned it is necessary to put a drop of oil in each of them so that they will turn freely upon the centers of the lathe or grinding machine, and my machine provides a means by which these drilled centers can be rapidly cleaned and oiled at a single operation.

Referring to the drawings, which are for illustrative purposes only,

Figure 1 is a cross-section through one embodiment of my invention with the parts in the position they assume when not externally restrained.

Fig. 2 is a view showing the method of operating the device which is shown in its compressed position.

In the embodiment of my invention shown in these drawings, I provide a casing 11 which has a cylindrical cavity 12 in which a cylindrical body or piston 13 is free to move vertically. The piston 13 is restrained from turning in the opening 12 by means of a set screw 14 and a keyway 15 into which the cylindrical point of the set screw projects. The upper portion of the piston 13 is flared to produce an inverted cone 16 in the center of which is located a nozzle 17, having a small hole 18, which forms a jet opening, this jet opening communicating with a larger opening 19, which extends downwardly through the piston 13 communicating with an oil cavity 20 formed inside the opening 12 beneath the bottom of the piston 13.

A spiral compression spring 21 is located in the cavity 20 acting upwardly on the piston 13 and tending to hold it in the position shown in Fig. 1, the upward movement of the piston 13 being arrested by the point of the set screw striking against the end of the keyway 15. A cleaning or filling opening 22 is provided with a plug 23. The nozzle 17 projects slightly above the bottom of the conical opening 16 which communicates through a strainer 24 with an oil relief cavity 25. This oil relief cavity also communicates with the cavity 20 but is provided with a ball 26 which is forced upwardly against a seat 27 to prevent any oil from flowing upwardly through the opening 25 whenever pressure is put on the cavity 20. The ball 26 is restrained by a pin 28. Surrounding the piston 13 inside the casing 11 is an annular opening 30 communicating through a hole 31 with the lower portion of the cavity 20, this hole 31 also being provided with a ball 32 which is forced upwardly against a seat 33 whenever any pressure is put on the oil in the cavity 20. The ball 32 is inserted through an opening 34 closed by threaded stud 35.

The method of operation is as follows:

The shafting 40, which it is desired to machine and which is provided with a drilled center 14, is forced downwardly into the cone 16, the casing 11 resting on a bench 42. If the shaft is held approximately vertical it slides down over the surface of the cone 16 until it is quite accurately centered over the jet opening 18. At the same time the weight of the shaft 40 and the pressure of the hand forces the piston 13 downwardly against the action of the spring 21, putting the oil in the cavity 20 under considerable pressure. This pressure forces the balls 26 and 32 up against their seats preventing any considerable quantity of oil from flowing upwardly through the holes 25 and 31. At the same time the oil is forced upwardly through the opening 19 and through the small jet opening 18 under considerable pressure and at a high velocity. The jet opening 18 is just below and in line with the drilled center 41, the small jet of oil under pressure being forced into the drilled center 41 and washing out any chips or dirt which may be in the center, at the same time leaving a drop of oil in the center 41 which is therefore cleaned and oiled ready for any subsequent machining operation. The remaining oil falls in the bottom of the cone 16 and runs downwardly through the screen 24 and the opening 25 to the cavity 20. Any oil which is forced upwardly around the periphery of the piston 13 runs into the annular groove 30 and drains downwardly through the opening 31. Some of the oil tends to adhere to the periphery of the piston 13 and this oil also runs down and is caught in the annular groove 30 being thus returned to the cavity 20.

It will be seen that my invention comprises a novel conception in that it discloses the use of a jet of fluid under pressure for cleaning centers. It further discloses such a jet which is operated only when the shaft is in place and it still further discloses a device in which pressure of the shaft generates the jet.

I claim as my invention:—

1. In a center cleaning and oiling device, a casing, a body sliding in oil tight relationship in said casing, which has an oil cavity formed therein below said body, walls forming a shaft centering inverted cone concentric with an oil jet opening in said body, said jet opening being in open communication with said cavity, and a valve placed in a drain opening which connects the lower end of said cone with said cavity, said valve being so placed that oil may drain from said cone into said cavity but is prevented from passing from said cavity into said cone.

2. In a center cleaning and oiling device, a casing, a body sliding in oil tight relationship in said casing, which has an oil cavity formed therein below said body, a spring normally holding said body in its upper position, walls forming a shaft centering inverted cone concentric with an oil jet opening in said body, said jet opening being in open communication with said cavity, and a valve placed in a drain opening which connects the lower end of said cone with said cavity, said valve being so placed that oil may drain from said cone into said cavity but is prevented from passing from said cavity into said cone.

3. A center cleaning and oiling device comprising a casing; a piston sliding in a cylindrical cavity in said casing; a spring forcing said piston upwardly in said casing; means for limiting said upward movement; an inverted cone secured to the upper end of said piston; a nozzle projecting upwardly into said cone and having a small hole in communication with a hole extending entirely through said piston and communicating with an oil cavity below said piston; a check valve arranged to close a passage in said casing which communicates with said oil cavity whenever the oil in said oil cavity is put under pressure, said passage communicating above said valve with an annular oil collecting opening surrounding said piston; and a valve closing a second opening through said piston whenever the oil in said oil cavity is put under pressure.

4. A center cleaning and oiling device comprising a casing; a piston sliding in a cylindrical cavity in said casing; a spring forcing said piston upwardly in said casing; means for limiting said upward movement; an inverted cone secured to the upper end of said piston; a nozzle projecting upwardly into said cone and having a small hole in communication with a hole extending entirely through said piston and communicating with an oil cavity below said piston; and a valve closing a second opening through said piston whenever the oil in said oil cavity is put under pressure.

In testimony whereof, I have hereunto set my hand at Los Angeles, California, this 8th day of October, 1919.

NICHOLAS E. BROWN.